(12) United States Patent
Sampson et al.

(10) Patent No.: US 7,824,556 B2
(45) Date of Patent: *Nov. 2, 2010

(54) METHODS FOR MAKING CHLOROUS ACID AND CHLORINE DIOXIDE

(75) Inventors: Allison H. Sampson, 35 Grace View Dr., Easton, CT (US) 06612; Richard L. Sampson, 35 Grace View Dr., Easton, CT (US) 06612

(73) Assignees: Allison H. Sampson, Fair Oaks Ranch, TX (US); Richard L. Sampson, Fair Oaks Ranch, TX (US)

( * ) Notice: Subject to any disclaimer, the term of this patent is extended or adjusted under 35 U.S.C. 154(b) by 1205 days.

This patent is subject to a terminal disclaimer.

(21) Appl. No.: 11/251,923

(22) Filed: Oct. 18, 2005

(65) Prior Publication Data

US 2006/0034749 A1    Feb. 16, 2006

(51) Int. Cl.
*C02F 1/76* (2006.01)
*D21C 9/12* (2006.01)
*A23L 3/358* (2006.01)
*C01B 11/08* (2006.01)

(52) U.S. Cl. .............. 210/754; 210/764; 423/472; 423/473; 423/477; 426/332; 426/335; 426/644; 426/654; 426/665; 422/28; 422/32; 162/66; 162/87; 510/382; 510/383

(58) Field of Classification Search .............. 423/472, 423/473, 477; 426/332, 335, 644, 654, 665; 422/28, 32; 162/66, 87; 510/382, 383; 210/754, 210/764

See application file for complete search history.

(56) References Cited

U.S. PATENT DOCUMENTS

| | | | |
|---|---|---|---|
| 2,071,091 A * | 2/1937 | Taylor | 424/661 |
| 3,082,146 A * | 3/1963 | Wentworth et al. | 162/161 |
| 3,684,437 A | 8/1972 | Callerame | |
| 3,828,097 A | 8/1974 | Callerame | |
| 3,857,737 A | 12/1974 | Kemp et al. | |
| 4,504,442 A | 3/1985 | Rosenblatt et al. | |
| 4,681,739 A | 7/1987 | Rosenblatt et al. | |
| 4,801,353 A * | 1/1989 | Mason | 162/73 |
| 4,880,711 A | 11/1989 | Luczak et al. | |
| 4,892,148 A * | 1/1990 | Mason | 166/305.1 |
| 5,008,096 A | 4/1991 | Ringo | |
| 5,078,908 A | 1/1992 | Ripley et al. | |
| 5,100,652 A | 3/1992 | Kross et al. | |
| 5,389,390 A * | 2/1995 | Kross | 426/332 |
| 5,391,533 A | 2/1995 | Peterson et al. | |
| 5,435,984 A | 7/1995 | Daly et al. | |
| 5,651,996 A | 7/1997 | Roozdar | |
| RE36,064 E | 1/1999 | Davidson et al. | |
| 6,063,425 A * | 5/2000 | Kross et al. | 426/335 |
| 6,077,495 A | 6/2000 | Speronello et al. | |
| 6,123,966 A | 9/2000 | Kross | |
| 6,171,485 B1 | 1/2001 | Küke | |
| 6,200,557 B1 | 3/2001 | Ratcliff | |
| 6,265,343 B1 | 7/2001 | Daly et al. | |
| 6,287,533 B1 | 9/2001 | Khan et al. | |
| 2001/0001655 A1 | 5/2001 | Kuke | |
| 2004/0071627 A1 | 4/2004 | DiMascio | |
| 2005/0095192 A1 | 5/2005 | DiMascio | |

FOREIGN PATENT DOCUMENTS

| | | |
|---|---|---|
| EP | 0 365 501 | 4/1990 |
| GB | 791680 | 3/1958 |

OTHER PUBLICATIONS

White; Handbook of Chlorination and Alternative Disinfectants; Fourth Edition; 1999; pp. 1153-1202.
Gordon et al.; The Chemistry of Chlorine Dioxide, Progress in Inorganic Chemistry; vol. 15; 1972; pp. 201-286.
Helfferich; Ion Exchange; 1995; pp. 519-550.
Duolite Ion-Exchange Manual; Chemical Process Company; 1960.
Gates; The Chlorine Dioxide Handbook, Water Disinfection Series, AWWA; 1998.
Lewatit, Bayer AG; Catalytic Removal of Dissolved Oxygen from Water, 1990.
Dence et al.; Pulp Bleaching Principles and Practice; Tappi Press, 1996.
Simpson et al.; A Focus on Chlorine Dioxide: The "Ideal" Biocide, 2000.
Encyclopedia.Com; Mechanism of Catalysis.
McPeak et al.; Iron in Water and Processes for its Removal; 21$^{st}$ Annual Liberty Bell Corrosion Course; 1983.
Manganese Greensand CR & IR; Inversand Company; 1998.
Masschelein; Chlorine Dioxide, Chemistry and Environmental Impact of Oxychlorine Compounds; Ann Arbor Science Publishers, Inc.; 1979.
XP-002227957; JP 6271301; Suido Kiko Co Ltd; 1994; Abstract.

* cited by examiner

*Primary Examiner*—Ngoc-Yen M Nguyen
(74) *Attorney, Agent, or Firm*—Jacobson Holman PLLC

(57) ABSTRACT

Chlorous acid is generated from a chlorite salt precursor, a chlorate salt precursor, or a combination of both by ion exchange. The ion exchange material facilitates the generation of chlorous acid by simultaneously removing unwanted cations from solution and adding hydrogen ion to solution. Chlorine dioxide is generated in a controlled manner from chlorous acid by catalysis. Chlorine dioxide can be generated either subsequent to the generation of chlorous acid or simultaneously with the generation of chlorous acid. For catalysis of chlorous acid to chlorine dioxide, the chlorous acid may be generated by ion exchange or in a conventional manner. Ion exchange materials are also used to purify the chlorous acid and chlorine dioxide solutions, without causing degradation of said solutions, to exchange undesirable ions in the chlorous acid and chlorine dioxide solutions with desirable ions, such as stabilizing ions, and to adjust the pH of chlorous acid and chlorine dioxide solutions.

5 Claims, 2 Drawing Sheets

METHODS FOR MAKING CHLOROUS ACID AND CHLORINE DIOXIDE

FIELD OF INVENTION

The present invention relates to a method for generating chlorous acid from an aqueous chlorite salt solution or an aqueous chlorate salt solution, or a combination of both solutions. The present invention also relates to a method for generating chlorine dioxide by means of catalysis of chlorous acid, either subsequent to or simultaneously with generation of the chlorous acid from a chlorite/chlorate salt solution.

BACKGROUND OF THE INVENTION

The generation of chlorous acid by the acidification of an aqueous chlorite salt solution or stabilized aqueous chlorine dioxide solution (stabilized chlorite salt solution) by an acid is well known by the following reaction:

$$Na^+ClO_2^- + H^+ \rightarrow H^+ClO_2^- + Na^+ \quad (1)$$

It is also well known that over time, chlorous acid slowly decomposes to chlorine dioxide by the following reaction:

$$5HClO_2 \rightarrow 4ClO_2 + HCl + 2H_2O \quad (2)$$

This reaction (2) predominates at low acid and high chlorite concentrations, making the reaction difficult to control, especially in high alkalinity water supplies. Further, this decomposition is slow. At chlorite concentrations greater than 20,000 mg/L, the reaction rate is 5 minutes at a pH<0.5. However, if the pH of the same chlorite solution is increased to >1.0, the reaction is not complete after 60 minutes.

It is also well known that in an oxidizing environment, such as in the presence of chlorine or an anode, chlorine dioxide can be generated from chlorous acid by the following reaction:

$$HClO_2 - e^- \rightarrow ClO_2 + H^+ \quad (3)$$

It is further known that chlorous acid is generated by the acidification of chlorate salt by the following two-step reaction:

$$Na^+ClO_3^- + H^+ \rightarrow H^+ClO_3^- + Na^+ \quad (4)$$

$$HClO_3 + HCl \rightarrow HClO_2 + HOCl \quad (5)$$

In this reaction, hypochlorous acid, the ionized form of chlorine in water, is also generated reaction (5). The generation of chlorine dioxide occurs via the one of the following mechanisms:

$$HClO_3 + HClO_2 \rightarrow 2ClO_2 + H_2O \quad (6)$$

$$HOCl + HCl \rightarrow Cl_2 + H_2O \quad (7)$$

$$2HClO_2 + HOCl + HCl \rightarrow 2ClO_2 + 2HCl + H_2O \quad (8)$$

The generation of chlorine dioxide from chlorate salt, however, is very difficult to control. In practice, excess acidity is required to start the reaction, but if the acidity is too high, the following side reaction predominates, and little to no chlorine dioxide is generated.

$$ClO_3^- + 6H^+ + 6e^- \rightarrow Cl^- + 3H_2O \quad (9)$$

In practice, the following reduction reactions are used to generate chlorine dioxide from chlorate salt. High concentrations of all precursors must be used to start the reactions, but when the reactions do not go to completion, undesirable byproducts or unreacted precursor materials contaminate the chlorine dioxide solutions. In addition, the chloride ion must be present, either from the decomposition of chlorate or the addition of the chloride ion itself, for chlorine dioxide to be generated. Overall reactions for the generation of chlorine dioxide from chlorate are listed below.

$$2ClO_3^- + SO_2 \rightarrow 2ClO_2 + SO_4^{2-} \quad (10)$$

$$4ClO_3^- + CH_3OH + 4H^+ \rightarrow 4ClO_2 + HCOOH + 3H_2O \quad (11)$$

$$ClO_3^- + Cl^- + 2H^+ \rightarrow ClO_2 + Cl_2 + H_2O \quad (12)$$

$$2ClO_3^- + H_2O_2 + 2H^+ \rightarrow 2ClO_2 + O_2 + 2H_2O \quad (13)$$

It is further known that a mixture of chlorite salt and chlorate salt in the presence of hydrogen ion will generate chlorine dioxide by the following overall reaction:

$$2H^+ + ClO_2^- + ClO_3^- \rightarrow 2ClO_2 + H_2O \quad (14)$$

This reaction is also shown in a different format in reaction (6). However, the rate of reaction to chlorine dioxide of the chlorite salt is 100 times faster than the rate of reaction to chlorine dioxide of the chlorate salt.

The use of chlorine dioxide in many applications has been limited due to the inability to control the reaction chemistries and the inefficiency of the reactions in solutions. Since chlorine dioxide is an unstable gas, even in solution, it must be generated on-site and used shortly after generation. Large-volume industrial applications such as pulp and paper bleaching, municipal water pretreatment and disinfection, food processing disinfection, and cooling tower disinfection have been successful due to the ability in these applications to safely handle concentrated and aggressive oxidizers and acids.

Some consumer and medical applications have also had success. Chlorite salt-based toothpastes, mouthwashes, and disinfecting skin gels use either the pH of the mouth or a weak-acid activator to slightly, acidify the chlorite salt so that some chlorous acid is formed. The chlorous acid will then slowly decompose to chlorine dioxide by reaction (2).

It is also described in U.S. Pat. No. 6,200,557 B1 that in a topical solution designed to treat HIV, the chemical addition of phosphates will retard the loss of chlorine dioxide from solution at pH 6-7.4. This is especially beneficial in this topical application so that contact time of chlorine dioxide on the skin surface is increased to allow better treatment of the HIV.

However, in all of the prior art processes, controlling the reactions has remained a major obstacle. In addition, unreacted precursor components and reaction by-products are undesirably carried over into the product solutions. Also, in many instances, the pH of the product is so low due to the excess acid in solution that it cannot be used in certain applications.

SUMMARY OF THE INVENTION

In accordance with the present invention, it has been discovered that chlorous acid can be generated in a controlled manner from an aqueous chlorite salt solution or an aqueous chlorate salt solution, or a combination of both, by ion exchange. It has further been discovered that chlorine dioxide can be generated from chlorous acid by the use of at least one catalytic material. The chlorous acid for conversion to chlorine dioxide can be by ion exchange reaction in accordance with the present invention, or by conventional acidification. Preferred catalysts in accordance with the present invention include platinum, palladium, manganese dioxide, carbon and ion exchange material.

The chlorous acid may be generated separately in a first step and subsequently catalyzed to form the chlorine dioxide in a second step, or the chlorous acid and the chlorine dioxide may be generated simultaneously in the same reaction environment in the presence of the requisite catalyst. The process may be performed in either a continuous or a batch manner, and the reaction must be carried out in an aqueous solution or otherwise aqueous moist environment, i.e., in the presence of water or water vapor.

In the preferred embodiment of the present invention, the chlorous acid is generated by a salt cation/hydrogen ion exchange of chlorite salt or chlorate salt, or a combination of both, and the chlorous acid is then catalyzed in a moist environment to form chlorine dioxide either subsequently or simultaneously. Further, it has been found in accordance with the present invention, that chlorous acid, generated by the chemical acidification of chlorite salt or chlorate salt or both can also be catalyzed in a moist non-liquid environment to form chlorine dioxide either subsequently or simultaneously.

In addition, it has been found in accordance with the present invention that additional precursors may be used with the chlorite salt solution or chlorate salt solution to enhance the catalysis of chlorous acid in a moist environment to form chlorine dioxide either subsequently or simultaneously. Such precursors include but are not limited to permanganate ion, chloride ion, sodium acid sulfite, peroxide and alcohol.

Still further, it has been found in accordance with the present invention that anion exchange materials are a preferred source of chlorite and/or chlorate ion, exchanged with a counter anion in a moist acidic environment to form chlorous acid, and further catalyzed in the moist environment to form chlorine dioxide either subsequently or simultaneously. By the ion exchange, a solution of chlorous acid can be generated from chlorite salt and/or chlorate salt by the salt cation/hydrogen ion exchange. Additionally, ionic contaminants otherwise contained in the chlorous acid and/or chlorine dioxide solution can be removed with ion exchange, and ionic stabilizers may be added to the chlorous acid and/or the chlorine dioxide solutions via ion exchange. Still further, the pH of the chlorous acid and/or chlorine dioxide solutions may be adjusted by the use of ion exchange.

It is, therefore, an object of the present invention to generate chlorine dioxide from chlorous acid in the presence of at least one catalytic material in either a continuous or batch process in an aqueous solution or otherwise aqueous moist environment.

Another object of the present invention is to generate a chlorous acid solution generally free of cations, except hydrogen ion, in either a continuous or batch process, in an aqueous solution or otherwise aqueous moist environment.

A further object of the present invention is to generate chlorous acid and chlorine dioxide simultaneously in the presence of at least one catalytic material in either a continuous or batch process in an aqueous solution or otherwise aqueous moist environment.

A still further object of the present invention is to utilize an anion exchange material to supply chlorite ion and/or chlorate ion for the generation of chlorous acid in either a continuous or batch process in an aqueous solution or otherwise aqueous moist environment.

Still another object of the present invention is to purify the resulting chlorous acid and/or chlorine dioxide solution to remove any ionic contaminants by the use of ion exchange in either a continuous or batch process.

Yet a further object of the present invention is to adjust the pH of either the chlorous acid solution and/or the chlorine dioxide solution by use of ion exchange in either a continuous or batch process.

A final object of the present invention to be stated herein is to add ionic stabilizers to either the chlorous acid solution and/or the chlorine dioxide solution by using ion exchange in either a continuous or batch process.

These together with other objects and advantages, which will become subsequently apparent, reside in the details of the technology as more fully hereinafter described and claimed, reference being had to the accompanying drawings forming a part hereof, wherein like numerals refer to like parts throughout.

DETAILED DESCRIPTION OF THE INVENTION

Figure 1:
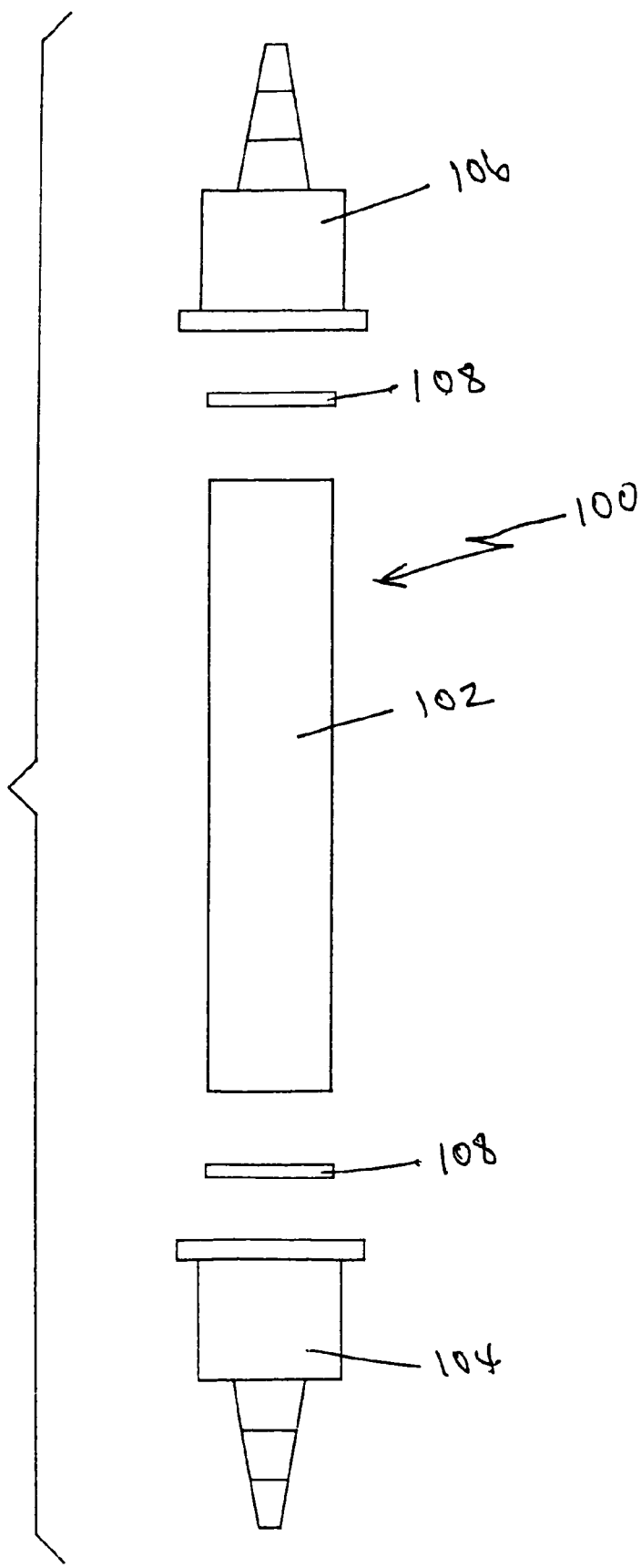
FIG. 1 shows an exploded elevational view of a plastic tube used in the tests of Examples 1-11 described in this application.

In describing the present invention, specific terminology will be used for the sake of clarity. However, the invention is not intended to be limited to the specific terms so selected, or to the specific embodiments disclosed. It is to be understood that each specific term includes all technical equivalents, which operate in a similar manner to accomplish a similar purpose, and the specific embodiments are intended to illustrate, but not limit, the broad technical application and utility of the present invention.

As used herein, the term "solution" shall mean a mixture formed by a process by which a solid, liquid, or gaseous substance is mixed with a liquid, whether that liquid is a droplet, aerosol, vapor, or mist. Also, as used herein, the term "moist environment" shall mean that the environment in which the reaction occurs contains water moisture, ranging from a slightly humid environment to fully wet. Also, as used herein, the term "precursor" shall be used to mean any solution and/or combination of solutions used to generate chlorous acid and/or chlorine dioxide.

It is well known to those knowledgeable of the manufacture of chlorine dioxide that chlorous acid is formed by the acidification of chlorite salt and/or chlorate salt by the reactions (1), (4), and (5). In these reactions, hydrogen ion is placed in solution where it partially acidifies the chlorite salt and/or chlorate salt. The equilibrium conditions of the solution prevent the total acidification of the chlorite and/or chlorate salts, however, because sodium ion remains in solution. It has now been surprisingly found that if the sodium ion is replaced by a hydrogen ion by means of a cation exchange material, the equilibrium conditions of the solution change, and total acidification of the chlorite salt and/or chlorate salt is possible, thereby making a pure chlorous acid solution.

Chlorous acid and aqueous solutions containing chlorous acid are particularly useful in applications where low-level disinfection over a long period of time is desirable. Some of these applications include disinfection of skin, the mouth, and cow teats. In addition, chlorous acid has a relatively low volatility level, making it applicable for surface disinfection in environments where off-gassing could be harmful. However, due to relatively high levels of residual chlorite in chlorous acid solutions and their inability to rapidly disinfect, chlorine dioxide is preferred in applications such as the disinfection of drinking water, cooling towers, food, and surfaces. In addition, chlorine dioxide is desirable for oxidizing organic contaminants and reducing iron and manganese levels in drinking water.

Further, it has been surprisingly discovered that a chlorous acid solution can be readily catalyzed to form chlorine dioxide. The source of the chlorous acid solution can be either that generated by ion exchange or by conventional acidification. If the latter, the catalytic conversion of the chlorous acid to chlorine dioxide drives the acidification reaction to completion or substantial completion.

By definition, catalysts work by changing the activation energy for a reaction, i.e. the minimum energy needed for the reaction to occur. This is accomplished by providing a new mechanism or reaction path through which the reaction can proceed. When the new reaction path has a lower activation energy, the reaction rate is increased, and the reaction is said to be catalyzed. When catalysis is used to generate chlorine dioxide from chlorous acid in the present invention, it was surprisingly found that neither high concentrations of precursor solutions nor high concentrations of chlorous acid were required to initiate the reactions. Further, it was surprisingly discovered that the reactions proceeded toward completion rapidly, thus decreasing the opportunity for undesirable byproducts or unreacted precursor materials to contaminate the chlorine dioxide solutions.

There are many catalysts that can be used within the scope of the present invention. These include, but are not limited to platinum, palladium, manganese dioxide, carbon, and ion exchange material. Further, it is well known that depositing such catalysts on various substrates, such as zeolites, aids in the catalysis by increasing surface area. Such catalysts are commercially available, and it is within the scope of those skilled in the art to choose an appropriate catalytic material and/or substrate to catalyze chlorous acid to chlorine dioxide.

Further, it has been discovered that an anion exchange material can be used to contribute a controlled amount of anions to the precursor, chlorous acid solution, and/or chlorine dioxide solution. For example, the chloride ion must be present for chlorous acid to be generated from a chlorate salt precursor. Although the necessary chloride may be present from the decomposition of chlorate, anion resin in the chloride form may be used to contribute additional chloride ion to the acidified chlorate salt precursor.

Ion exchange material can also be used to remove unwanted ions from the precursor, chlorous acid, and/or chlorine dioxide solution. For example, if the reaction to chlorine dioxide does not go to completion, unreacted chlorite and/or chlorate anion will be present in the chlorine dioxide solution. Anion exchange material can be used to remove the chlorite and/or chlorate ion. Further, if the precursor solution is acidified chemically, excess sodium ion will be present in the chlorine dioxide solution. Cation exchange material can be used to remove the sodium ion.

Ion exchange materials, such as inorganic and organic resins, membranes, powders, gels, and solutions are well known to those skilled in the art, and the type of ion exchange material used does not limit the invention. Examples of ion exchange materials are weak acid cation resins and powders, strong acid cation resins and powders, weak base anion resins and powders, strong base anion resins and powders, sulfonated polystyrene solutions, cation and anion selective membranes. Selection of a particular ion exchange material is considered within the skill of those knowledgeable in the field.

In one form of the present invention, cation exchange material is used to exchange the salt cation in a chlorite precursor with hydrogen ion to form chlorous acid. The resulting chlorous acid is then placed in contact with a catalytic material for a time sufficient to form chlorine dioxide. If the chosen catalyst is able to perform oxidation, such as manganese dioxide on the surface of greensand, reaction (3) predominates, and 100% of the chlorous acid can convert to chlorine dioxide. However, if the chosen catalyst is unable to perform oxidation, such as platinum, reaction (2) predominates, and only 80% of the chlorous acid can convert to chlorine dioxide.

In another form of the present invention, acid is added to the chlorite precursor to form chlorous acid with the salt cation still present in solution. The chlorous acid is then placed in contact with a catalytic material for a time sufficient to form chlorine dioxide. The choice of which acid to use depends upon the application. For example, if the chlorous acid and/or chlorine dioxide solution is to be used in a food processing application, an acid such as acetic acid may be preferred. If the chlorous acid and/or chlorine dioxide solution is to be used in a high purity industrial application, electrochemically-generated acid may be used. The choice of acid is well within the scope of knowledge of those skilled in this technology.

In another form of the present invention, an acidic reducing agent precursor is added to the chlorate precursor as the chlorate precursor is placed in contact with a catalytic material for a time sufficient to cause the generation of chlorous acid and chlorine dioxide simultaneously. If hydrochloric acid is used, it supplies both the acidity and the chloride required for the reaction. However, any acid source may be used, and the necessary chloride may come from the decomposition of the chlorate ion.

In another form of the present invention, an acid precursor and a reducing agent precursor are added to the chlorate precursor as the chlorate precursor is placed in contact with a catalytic material for a time sufficient to cause the generation of chlorous acid and chlorine dioxide simultaneously. Any acid source may be used, and the necessary chloride may come from the decomposition of the chlorate ion.

In another form of the present invention, a chlorate precursor is placed in contact with a cation exchange material mixed with a catalytic material. The salt cation in the chlorate precursor is exchanged with hydrogen ion as the chlorate precursor contacts both the cation exchange material and the catalytic material for a time sufficient to cause the generation of chlorous acid and chlorine dioxide simultaneously. If necessary, other precursors, such as sodium chloride, may be dosed along with the chlorate precursor to aid in the reaction.

In yet another form of the present invention, a reducing agent is placed in contact with the chlorate precursor either prior to the precursor being placed in contact with the catalytic material or as the precursor is placed in contact with the catalytic material for a time sufficient to form chlorine dioxide. In this form of the present invention, the catalytic material aids in reactions (10), (11), (12), and (13).

In another form of the present invention, a mixed chlorite and chlorate precursor is acidified as it is placed into contact with a catalytic material for time sufficient to form chlorine dioxide.

DESCRIPTION OF SPECIFIC EMBODIMENTS AND EXAMPLES

Precursor Solution for Examples 1-6

In Examples 1-6, a single chlorite precursor solution was used for all Examples. The chlorite precursor solution was prepared by diluting an aqueous 25% sodium chlorite solution with reverse osmosis water. The pH of the resultant solution was measured to be 8.5 with a Hach Sension 1 pH meter. The chlorite concentration in the precursor solution was measured to be 823 mg/L by using a Hach Digital Titrator, Iodometric Test Kit for Chlorine. To begin the measurement, 100 ml of reverse osmosis water was placed in a 250-ml Erlenmeyer flask, and 2 ml of the sample precursor solution was placed into the reverse osmosis water. One Potassium Iodide Powder Pillow and one Dissolved Oxygen Reagent 3 Pillow were added to the solution in the flask, swirled to mix, and placed in the dark for 10 minutes to allow the reaction to go to completion. Using a 0.113 N Sodium Thiosulfate Cartridge in the Digital Titrator, the solution was titrated to a pale yellow. Next, Starch Indicator Solution was added until the solution turned blue. The solution was titrated again until the solution remained colorless for 30 seconds. The titrator reading was recorded and divided by 800 to determine the milliliters of titrant used. Then the values were plugged into the following formula to determine the concentration of chlorite in the precursor solution:

$$\frac{\text{ml of titrant} \times \text{normality of sodium thiosulfate} \times 67{,}450}{\text{ml of sample} \times 4}$$

Plastic Testing Tubes for Examples 1-10

A sample of the plastic tubes used for carrying out the tests set forth in Examples 1-10 in the present application is shown in FIG. 1 and generally designated by reference numeral 100. The plastic test tube 100 includes a generally cylindrical body 102 having a conventional connection closure mounted at each end in the form of an inlet bottom connection 104 and an outlet upper end connection 106. Porex support media was cut to fit the inner diameter of the cylindrical tube 102, and a Porex disk 108 was placed at each end between the end of the cylindrical tubing 102 and the end closures 104 and 106 to act as support for the filling. The feed tubing ran to the inlet bottom connection 104 and outlet tubing ran from the outlet upper end connection 106.

Example 1

Chlorous Acid Generation by Cation Exchange

In Example 1, one 30 ml plastic test tube 100 as shown in FIG. 1 was clipped to a wall with pipe clips. The feed tubing ran from a reservoir containing the precursor solution to the bottom of the tube. The product tubing ran from the top of the tube to a brown sample bottle. In this example, the tube was filled with a commercially available strong acid organic cation resin in the hydrogen form, sold under the name Resintech CG-8, such that the tube was full.

A continuous stream of the chlorite precursor solution was passed upwardly through the tube such that the flow rate was 30 ml/min. A 250 ml sample of solution was taken from the tube's top end and placed in the brown bottle, sealed, and stored in a dark cabinet. A Hach 2010 Spectrophotometer using Method 8138 for the measurement of chlorine dioxide (0-700 mg/L) was used to test the stored sample for chlorine dioxide at one-hour intervals for eight hours.

Figure 2:
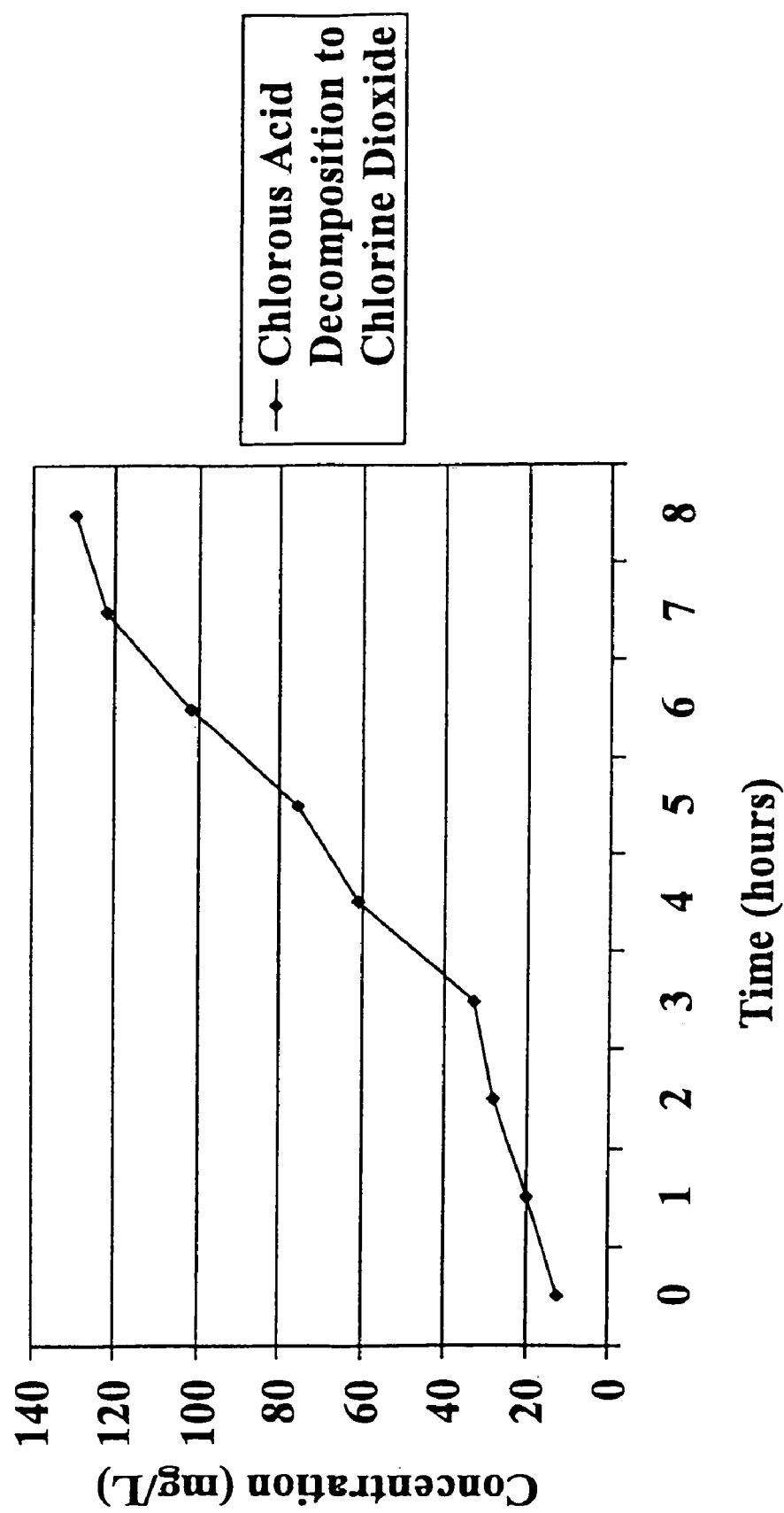
FIG. 2 is a graph showing the chlorine dioxide concentration versus time of a decomposing chlorous acid solution generated by ion exchange.

The results of the foregoing test demonstrate, first, that chlorous acid may be generated from a chlorite precursor when placed in contact with a cation exchange material. Second, the development of chlorous acid to chlorine dioxide over time in this test are shown in FIG. 2, which demonstrates the slow reaction time for chlorous acid to decompose to chlorine dioxide.

Example 2

Chlorous Acid Generation by Cation Exchange from a Chlorite Precursor and Subsequent Catalytic Chlorine Dioxide Generation In Example 2, two identical 30 ml plastic test tubes 100 as shown in FIG. 1 were clipped to a wall with pipe clips. Interconnecting plastic tubing ran from the first test tube to the second so that solution flowed from the bottom to the top of each test tube. The feed tubing ran from a reservoir containing the precursor solution to the bottom of the first test tube. The product tubing ran from the top of the second test tube to the flow-through cell of a Hach 2010 Spectrophotometer using Method 8138 for the measurement of chlorine dioxide (0-700 mg/L).

(A) The first test tube was filled with the Resintech CG-8 strong acid organic cation resin in the hydrogen form such that the tube was full. The second test tube was packed with a commercially available inorganic cation resin in the hydrogen form, sold under the name Resintech SIR-600, having platinum catalyst placed on the surface of the inorganic cation resin such that the tube was full. To place the platinum on the surface of the Resintech SIR-600 resin, a 100-ml solution of platinnic chloride was made such that the solution contained 1 gram of platinum. The platinnic chloride solution was then sprayed in a fine mist onto the surface of one liter of Resintech SIR-600 resin so as to form an even coating. The coated Resintech SIR-600 resin was then placed in an oven at 550° F. for three hours. Although platinnic chloride was used in this test, any soluble platinum salt could have been used for the coating material. Such salts and methods are well known to those schooled in the art of catalysis, and many are readily available as standard products. A continuous stream of the chlorite precursor solution was passed sequentially through the first and then the second test tube such that the flow rate was 30 ml/min.

(B) The first test tube was filled with the Resintech CG-8 strong acid organic cation resin in the hydrogen form such that the tube was full. The second test tube was packed with acid-washed carbon particles such that the drying tube was full. A continuous stream of the chlorite precursor solution was passed sequentially through the first and then the second test tube such that the flow rate was 30 ml/min.

(C) The first test tube was filled with the Resintech CG-8 strong acid organic cation resin in the hydrogen form such that the tube was full. The second test tube was packed with acid-washed carbon particles having platinum catalyst placed on the surface of the acid-washed carbon such that the tube was full. The platinum was placed on the surface of the acid-washed carbon particles by the same method described in Example 2(A) above for depositing platinum on the surface of the cation resin. A continuous stream of the chlorite precursor solution was passed sequentially through the first and then the second test tube such that the flow rate was 30 ml/min.

(D) The first test tube was filled with the Resintech CG-8 strong acid organic cation resin in the hydrogen form such that the tube was full. The second test tube was packed with regenerated manganese greensand such that the tube was full. A continuous stream of the chlorite precursor solution was passed sequentially through the first and then the second test tube such that the flow rate was 30 ml/min.

(E) The first test tube was filled with the Resintech CG-8 strong acid organic cation resin in the hydrogen form such that the tube was full. The second test tube was packed with the Resintech SIR-600 inorganic cation exchange resin having manganese dioxide placed on the surface of the inorganic cation exchange material such that the tube was full. To place the manganese dioxide on the surface of the Resintech SIR-600 resin, a 100-ml solution of manganese sulfate was made such that the solution contained 1 gram of manganese. The manganese sulfate solution was then sprayed in a fine mist onto the surface of one liter of Resintech SIR-600 resin so as to form an even coating. The coated Resintech SIR-600 resin was then placed in an oven at 550° F. for three hours which converted the manganese to manganese dioxide. Although manganese sulfate was used in this test, any soluble manganese salt could have been used for the coating material. Such salts and methods are well known to those schooled in the art of catalysis, and many are readily available as standard products. A continuous stream of the chlorite precursor solution was passed sequentially through the first and then the second test tube such that the flow rate was 30 ml/min.

(F) The first test tube was filled with the Resintech CG-8 strong acid organic cation resin in the hydrogen form such that the tube was full. The second test tube was packed with a chlorite regenerated form of a commercially available organic anion exchange material having palladium on the resin, sold under the name Lewatit K7333 by Bayer Corporation, such that the tube was full. As purchased, the resin is in the hydroxyl form, but for this example, the resin was regenerated with sodium chlorite solution so as to place the resin in the chlorite form. A continuous stream of the chlorite precursor solution was passed sequentially through the first and then the second test tube such that the flow rate was 30 ml/min.

The results of the tests in Examples 2(A) through 2(F) are shown in the following Table 1.

TABLE 1

| Example No. | Chlorine Dioxide Concentration (mg/L) |
|---|---|
| 2(A) | 575 |
| 2(B) | 427 |
| 2(C) | 526 |
| 2(D) | 549 |
| 2(E) | 804 |
| 2(F) | 284 |

Table 1 shows the concentration of chlorine dioxide after the chlorous acid from the first tube has been catalytically converted to chlorine dioxide in the second tube in the tests of Examples (A) through (F).

It will be seen that chlorous acid is significantly more readily converted to chlorine dioxide in the presence of a catalyst, as shown in all of Examples 2(A) through 2(F), compared to known chemical decomposition, as shown in Example 1, in which the chlorine dioxide concentration reaches only about 130 mg/L after eight hours, see FIG. 2.

Example 3

Simultaneous Generation of Chlorous Acid and Chlorine Dioxide by a Combination of Cation Exchange and Catalysis from a Chlorite Precursor In Example 3, one 30 ml plastic test tube 100 as shown in FIG. 1 was clipped to a wall with pipe clips. The feed tubing ran from a reservoir containing the precursor solution to the bottom of the tube. The product tubing ran from the top of the tube to the flow-through cell of a Hach 2010 Spectrophotometer using Method 8138 for the measurement of chlorine dioxide (0-700 mg/L). In this example, the test tube 100 was packed with a 50/50 mixture of the Resintech CG-8 strong acid organic cation resin in the hydrogen form and the Resintech SIR-600 inorganic cation resin in the hydrogen form having platinum catalyst placed on the surface of the inorganic cation resin in the method as described above in Example 2(A) such that the test tube was full.

A continuous stream of the chlorite precursor solution was passed through the test tube such that the flow rate was 30 ml/min. The resultant concentration of chlorine dioxide from the test tube was 522 mg/L. It will thus be seen that the simultaneous generation of chlorous acid and chlorine dioxide readily occurs from a chlorite precursor solution in the presence of a cation exchange material and suitable catalyst.

Example 4

Simultaneous Generation of Chlorous Acid and Chlorine Dioxide by a Combination of Acidification and Catalysis from a Chlorite Precursor In Example 4, one 30 ml plastic test tube 100 as shown in FIG. 1 was clipped to a wall with pipe clips. The feed tubing ran from a reservoir containing the precursor solution to the bottom of the test tube. The product tubing ran from the top of the test tube to the flow-through cell of a Hach 2010 Spectrophotometer using Method 8138 for the measurement of chlorine dioxide (0-700 mg/L). In this example, the test tube 100 was packed with the Resintech SIR-600 inorganic cation resin in the hydrogen form having platinum catalyst placed on the surface of the inorganic cation resin in the method as described above in Example 2(A) such that the test tube was full.

A continuous stream of the chlorite precursor solution was acidified to a pH of 2.5 and passed through the test tube such that the flow rate was 30 ml/min. The resultant concentration of chlorine dioxide from the test tube was 522 mg/L. It will thus be seen that the simultaneous generation of chlorous acid and chlorine dioxide readily occurs from an acidified chlorite precursor solution in the presence of a suitable catalyst.

Example 5

Purification of a Chlorine Dioxide Solution with Ion Exchange (A) In Example 5(A), two 30 ml plastic test tubes 100 as shown in FIG. 1 were clipped to a wall with pipe clips. Interconnecting plastic tubing ran from the first test tube to the second so that solution flowed from the bottom to the top of each tube. The feed tubing ran from a reservoir containing the precursor solution to the bottom of the first test tube. The product tubing ran from the top of the second test tube to the flow-through cell of a Hach 2010 Spectrophotometer using Method 8138 for the measurement of chlorine dioxide (0-700 mg/L). The first test tube was filled with the Resintech CG-8 strong acid organic cation resin in the hydrogen form such that the tube was full. The second test tube was packed with the Resintech SIR-600 inorganic cation resin in the hydrogen form having platinum catalyst placed on the surface of the inorganic cation resin in the method as described above in Example 2(A) such that the tube was full. A continuous stream of the chlorite precursor solution was passed sequentially through the test tubes such that the flow rate was 30 ml/min.

(B) In Example 5(B), three 30 ml plastic test tubes 100 as shown in FIG. 1 were clipped to a wall with pipe clips. Interconnecting plastic tubing ran from the first test tube to the second and from the second to the third so that solution flowed from the bottom to the top of each test tube. The feed tubing ran from a reservoir containing the precursor solution to the bottom of the first test tube. The product tubing ran from the top of the third test tube to the flow-through cell of a Hach 2010 Spectrophotometer using Method 8138 for the measurement of chlorine dioxide (0-700 mg/L). The first and second test tubes were filled as in Example 5(A). The third test tube was packed with a 50/50 mixture of the Resintech CG-8 strong acid organic cation resin in the hydrogen form and a commercially available weak base organic anion resin in the hydroxyl form, sold under the name Resintech WBMP, such that the tube was full. A continuous stream of the chlorite precursor solution was passed sequentially through the test tubes such that the flow rate was 30 ml/min.

The results of the tests in Examples 5(A) and 5(B) are shown in the following Table 2.

TABLE 2

| Example No. | Chlorine Dioxide Concentration (mg/L) |
|---|---|
| 5(A) | 546 |
| 5(B) | 542 |

Table 2 shows the concentration of chlorine dioxide before purification by ion exchange (Example 5(A)), and after purification by ion exchange (Example 5(B)). It will thus be seen that the concentration of chlorine dioxide is not affected if the chlorine dioxide solution is purified by ion exchange.

Example 6 pH Adjustment of a Chlorine Dioxide Solution with Ion Exchange (A) In Example 6(A), two 30 ml plastic test tubes 100 as shown in FIG. 1 were clipped to a wall with pipe clips. Interconnecting plastic tubing ran from the first test tube to the second so that solution flowed from the bottom to the top of each tube. The feed tubing ran from a reservoir containing the precursor solution to the bottom of the first test tube. The product tubing ran from the top of the second test tube to the flow-through cell of a Hach 2010 Spectrophotometer using Method 8138 for the measurement of chlorine dioxide (0-700 mg/L). The first test tube was filled with the Resintech CG-8 strong acid organic cation resin in the hydrogen form such that the tube was full. The second test tube was packed with the Resintech SIR-600 inorganic cation resin in the hydrogen form having platinum catalyst placed on the surface of the inorganic cation resin in the method as described above in Example 2(A) such that the tube was full. A continuous stream of the chlorite precursor solution was passed sequentially through the test tubes such that the flow rate was 30 ml/min. The pH of the resultant solution was 2.4.

(B) In Example 6(B), three 30 ml plastic test tubes 100 as shown in FIG. 1 were clipped to a wall with pipe clips. Interconnecting plastic tubing ran from the first test tube to the second and from the second to the third so that solution flowed from the bottom to the top of each tube. The feed tubing ran from a reservoir containing the precursor solution to the bottom of the first test tube. The product tubing ran from the top of the third test tube to the flow-through cell of a Hach 2010 Spectrophotometer using Method 8138 for the measurement of chlorine dioxide (0-700 mg/L). The first and second test tubes were filled as in Example 6(A). The third test tube was packed with an inorganic anion resin, hydrotalcite, in the carbonate form such that the drying tube was full. A continuous stream of the chlorite precursor solution was passed sequentially through the test tubes such that the flow rate was 30 ml/min. The pH of the resultant solution was 8.1.

The results of the tests in Examples 6(A) and 6(B) are shown in the following Table 3.

TABLE 3

| Example No. | Chlorine Dioxide Concentration (mg/L) |
|---|---|
| 6(A) | 546 |
| 6(B) | 541 |

Table 3 shows the concentration of chlorine dioxide before and after pH adjustment. It will accordingly be seen that the concentration of chlorine dioxide is not affected if the pH of the chlorine dioxide solution is adjusted by ion exchange.

Example 7

Addition of Stabilizing Ion to Chlorine Dioxide Solution (A) In Example 7(A), two 30 ml plastic test tubes 100 as shown in FIG. 1 were clipped to a wall with pipe clips. Interconnecting plastic tubing ran from the first test tube to the second so that solution flowed from the bottom to the top of each tube. The feed tubing ran from a reservoir containing the precursor solution to the bottom of the first test tube. The product tubing ran from the top of the second test tube to the flow-through cell of a Hach 2010 Spectrophotometer using Method 8138 for the measurement of chlorine dioxide (0-700 mg/L). The first test tube was filled with the Resintech CG-8 strong acid organic cation resin in the hydrogen form such that the tube was full. The second test tube was packed with the Resintech SIR-600 inorganic cation resin in the hydrogen form having platinum catalyst placed on the surface of the inorganic cation resin in the method described above in Example 2(A) such that the tube was full. A continuous stream of the chlorite precursor solution was passed sequentially through the test tubes such that the flow rate was 30 ml/min. The pH of the resultant solution was 2.4.

(B) In Example 7(B), three 30 ml plastic test tubes 100 as shown in FIG. 1 were clipped to a wall with pipe clips. Interconnecting plastic tubing ran from the first test tube to the second and from the second to the third so that solution flowed from the bottom to the top of each tube. The feed tubing ran from a reservoir containing the precursor solution to the bottom of the first test tube. The product tubing ran from the top of the third test tube to the flow-through cell of a Hach 2010 Spectrophotometer using Method 8138 for the measurement of chlorine dioxide (0-700 mg/L). The first and second test tubes were filled as in Example 7(A). The third test tube was packed with an inorganic anion resin, hydrotalcite, in the phosphate form such that the tube was full. A continuous stream of the chlorite precursor solution was passed sequentially through the tubes such that the flow rate was 30 ml/min. The pH of the resultant solution was 7.8.

The results of the tests in Examples 7(A) and 7(B) are shown in the following Table 4.

TABLE 4

| Example No. | Chlorine Dioxide Concentration (mg/L) |
|---|---|
| 7(A) | 546 |
| 7(B) | 544 |

Table 4 shows the concentration of chlorine dioxide before and after the addition of a stabilizing ion. It will thus be seen that the concentration of chlorine dioxide is not affected when a stabilizing ion, such as phosphate, is added to the chlorine dioxide solution.

Example 8

Simultaneous Generation of Chlorous Acid and Chlorine Dioxide by a Combination of Cation Exchange and Catalysis from a Chlorate Precursor In Example 8, a precursor solution was made containing both chlorate ion and chloride ion such that the concentration of the solution was 7,830 mg/L as chlorate and 4087 mg/L as chloride. The precursor solution was then placed in a reservoir and flowed through the apparatus.

One 30 ml plastic test tube 100 as shown in FIG. 1 was clipped to a wall with pipe clips. The feed tubing ran from a reservoir containing the precursor solution to the bottom of the test tube. The product tubing ran from the top of the tube to the flow-through cell of a Hach 2010 Spectrophotometer using Method 8138 for the measurement of chlorine dioxide (0-700 mg/L). In this example, the test tube was packed the same as in Example 3.

A continuous stream of the chlorate precursor solution was passed through the test tube such that the flow rate was 30 ml/min. The resultant concentration of chlorine dioxide from the test tube was 93 mg/L. It will thus be seen that a simultaneous generation of chlorous acid and chlorine dioxide from a chlorate precursor solution occurs in the presence of a cation exchange material and suitable catalyst.

Example 9

Simultaneous Chlorous Acid and Chlorine Dioxide Generation Using Ion Exchange and a Hydrochloric Acid Precursor In Example 9, one 30 ml plastic test tube 100 as shown in FIG. 1 was clipped to a wall with pipe clips. The feed tubing ran from a gas-washing bottle containing 150 ml of a 30% hydrochloric acid precursor solution to the bottom of the test tube. The product tubing ran from the top of the test tube to a second gas-washing bottle that contained 200 ml of reverse osmosis water. The test tube was packed with a chlorate regenerated form of a commercially available organic anion exchange material having palladium on the resin, sold under the name Lewatit K7333 by Bayer Corporation, such that the tube was full. As purchased, the resin is in the hydroxyl form, but for this example, the resin was regenerated with sodium chlorate solution so as to place the resin in the chlorate form. The hydrochloric acid vapor was stripped from the hydrochloric acid precursor solution with compressed air and the vapor then flowed through the test tube. The final product from the test tube was sparged into the water in the second gas-washing bottle. The resultant solution from the second gas-washing bottle was tested for chlorine dioxide with a Hach 2010 Spectrophotometer using Method 8138 for the measurement of chlorine dioxide (0-700 mg/L).

A continuous stream of hydrochloric acid precursor vapor was passed through the test tube for 5 minutes. After 5 minutes, the concentration of chlorine dioxide was measured in the second gas-washing bottle. The resultant concentration of chlorine dioxide from the tube collected in the second gas-washing bottle was 187 mg/L. It will hence be seen that a simultaneous generation of chlorous acid and chlorine dioxide occurs in the presence of an acidic reducing agent, a suitable catalyst, and an anion exchange material in the chlorate form.

Example 10

Simultaneous Chlorous Acid and Chlorine Dioxide Generation Using Ion Exchange and a Sodium Acid Sulfite Precursor In Example 10, one 30 ml plastic test tube 100 as shown in FIG. 1 was clipped to a wall with pipe clips. The feed tubing ran from a gas-washing bottle containing 150 ml of a 20% sodium acid sulfite ($NaHSO_3$) precursor solution to the bottom of the test tube. The product tubing ran from the top of the test tube to a second gas-washing bottle that contained 200 ml of reverse osmosis water. The test tube was packed with the same organic anion exchange material in the chlorate form having palladium on the resin as described in Example 9 such that the tube was full. The sodium acid sulfite vapor was stripped from the sodium acid sulfite precursor solution with compressed air and the sodium acid sulfite vapor then flowed through the tube. The final product from the test tube was sparged into the water in the second gas-washing bottle. The resultant solution from the second gas-washing bottle was tested for chlorine dioxide with a Hach 2010 Spectrophotometer using Method 8138 for the measurement of chlorine dioxide (0-700 mg/L).

A continuous stream of sodium acid sulfite precursor vapor was passed through the tube for 5 minutes. After 5 minutes, the concentration of chlorine dioxide was measured in the second gas-washing bottle. The resultant concentration of chlorine dioxide from the test tube collected in the second gas-washing bottle was 576 mg/L. It will therefore be seen that a simultaneous generation of chlorous acid and chlorine dioxide occurs in the presence of an acidic reducing agent, a suitable catalyst, and an anion exchange material in the chlorate form.

Example 11

Simultaneous Chlorous Acid and Chlorine Dioxide Generation Using an Ion Exchange Catalyst and a Sodium Acid Sulfite Precursor In Example 11, one 30 ml plastic test tube 100 as shown in FIG. 1 was clipped to a wall with pipe clips. The feed tubing ran from a gas-washing bottle containing 150 ml of a 20% sodium acid sulfite ($NaHSO_3$) precursor solution to the bottom of the test tube. The product tubing ran from the top of the test tube to a second gas-washing bottle that contained 200 ml of reverse osmosis water. The test tube was packed with a known inorganic anion resin, hydrotalcite, regenerated to be in the chlorate form, such that the drying tube was full. The sodium acid sulfite vapor was stripped from the sodium acid sulfite precursor solution with compressed air and the sodium acid sulfite vapor then flowed through the tube. The final product from the test tube was sparged into the water in the second gas-washing bottle. The resultant solution from the second gas-washing bottle was tested for chlorine dioxide with a Hach 2010 Spectrophotometer using Method 8138 for the measurement of chlorine dioxide (0-700 mg/L).

A continuous stream of sodium acid sulfite precursor vapor was passed through the test tube for 5 minutes. After 5 minutes, the concentration of chlorine dioxide was measured in the second gas-washing bottle. The resultant concentration of chlorine dioxide from the test tube collected in the second gas-washing bottle was 318 mg/L. It will thus be seen that a simultaneous generation of chlorous acid and chlorine dioxide occurs in the presence of an acidic reducing agent and a catalytic anion exchange material in the chlorate form.

The foregoing descriptions and examples should be considered as illustrative only of the principles of the invention. Since numerous applications of the present invention will readily occur to those skilled in the art, it is not desired to limit the invention to the specific examples disclosed or the exact construction and operation shown and described. Rather, all suitable modifications and equivalents may be resorted to, falling within the scope of the invention.

What is claimed is:

1. A method of disinfecting an object, the method comprising:
    contacting a chlorite salt solution with a cation exchange material in the hydrogen form in a moist environment for a time sufficient to effect an essentially complete substitution of cations in the chlorite salt with hydrogen ions on the cation exchange material to form chlorous acid; and contacting the object with the chlorous acid to disinfect it.

2. The method of claim 1, wherein the object is a food processing object.

3. The method of claim 1, wherein the object is a pulp and paper bleaching object.

4. The method of claim 1, wherein the object is a cooling tower object.

5. The method of claim 1, wherein the object is a water treatment object.

* * * * *